(12) United States Patent
Venero et al.

(10) Patent No.: US 9,796,505 B1
(45) Date of Patent: Oct. 24, 2017

(54) BILLET SUPPORT FINGERS FOR PALLETIZATION

(71) Applicant: United Technologies Corporation, Hartford, CT (US)

(72) Inventors: Nicholas Venero, Clinton, NY (US); Claude A. Hutchings, Sauquoit, NY (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 15/089,148

(22) Filed: Apr. 1, 2016

(51) Int. Cl.
| B21C 47/22 | (2006.01) |
| B21C 47/24 | (2006.01) |
| B65H 16/08 | (2006.01) |
| B65D 19/38 | (2006.01) |
| B65D 19/44 | (2006.01) |
| B65D 19/02 | (2006.01) |

(52) U.S. Cl.
CPC ............. *B65D 19/38* (2013.01); *B65D 19/02* (2013.01); *B65D 19/44* (2013.01); *B65D 2519/00796* (2013.01); *B65D 2519/00805* (2013.01); *B65D 2519/00815* (2013.01)

(58) Field of Classification Search
CPC .. B65G 1/00; B65G 2201/0267; B65D 19/44; B65D 2519/00034; B65D 2519/00069; B65D 2519/00104; B65D 2519/00373; B65D 2519/00562
USPC ........ 108/52.1, 55.3, 57.31; 144/253.7, 423; 164/213; 193/35 SS; 198/600, 774.1, 198/775; 206/596; 269/131, 266, 294, 269/295, 296, 53, 56, 902; 29/564; 410/49; 414/416.04, 416.08, 416.09, 414/416.12, 608, 745.1, 745.7, 745.8, 414/745.9, 746.1–746.4, 746.8; 72/252, 72/420, 421; 82/126, 127
See application file for complete search history.

(56) References Cited

U.S. PATENT DOCUMENTS

| 1,871,077 | A | * | 8/1932 | Mowat | .................. | B23Q 7/001 |
| | | | | | | 408/49 |
| 2,639,050 | A | * | 5/1953 | Hoffmann, Jr. | .... | B65D 19/0095 |
| | | | | | | 108/52.1 |
| 2,682,244 | A | * | 6/1954 | Fortner | ..................... | F16L 1/10 |
| | | | | | | 192/41 R |
| 3,151,754 | A | * | 10/1964 | Kemp, Jr. | ................ | B65G 1/00 |
| | | | | | | 414/349 |
| 3,269,565 | A | * | 8/1966 | Kemp, Jr. | ................ | B65G 1/00 |
| | | | | | | 414/21 |

(Continued)

FOREIGN PATENT DOCUMENTS

| DE | 2063304 A1 | 7/1972 |
| EP | 1177994 A2 | 7/2001 |

(Continued)

OTHER PUBLICATIONS

Extended European Search Report for EP Application No. 17162848.0, Dated Aug. 29, 2017, 7 Pages.

*Primary Examiner* — Gregory Adams
(74) *Attorney, Agent, or Firm* — Kinney & Lange, P.A.

(57) ABSTRACT

A support assembly includes a pallet table having an upper surface. A plurality of support members are configured to pass through a pallet positioned on the upper surface of the pallet table. Each support member includes a receiving surface that defines a portion of a channel extending across the support members.

19 Claims, 9 Drawing Sheets

(56) References Cited

U.S. PATENT DOCUMENTS

| | | | |
|---|---|---|---|
| 3,351,027 A | 11/1967 | Ellard et al. | |
| 3,427,958 A * | 2/1969 | Glasson | B65B 27/10 100/16 |
| 3,889,831 A * | 6/1975 | Davis | B21C 47/22 206/389 |
| 3,935,679 A * | 2/1976 | Peter | B23Q 1/032 269/296 |
| 4,199,020 A * | 4/1980 | Buhrer | B22C 21/06 164/146 |
| 4,365,699 A * | 12/1982 | Dussud | B65G 7/04 193/35 MD |
| 4,439,099 A * | 3/1984 | Asari | B65G 57/186 414/790 |
| 4,448,298 A * | 5/1984 | Matsuo | B21B 39/02 198/451 |
| 4,571,141 A * | 2/1986 | Gieson | B65G 1/00 108/52.1 |
| 4,735,153 A * | 4/1988 | Wong | B65D 19/0012 108/57.16 |
| 4,822,011 A | 4/1989 | Goldbach et al. | |
| 4,984,962 A * | 1/1991 | Jarvinen | B60P 1/52 193/35 SS |
| 5,188,503 A * | 2/1993 | Appelberg | B21D 43/006 211/49.1 |
| 5,727,778 A * | 3/1998 | Nodar | B25B 1/205 269/296 |
| 5,956,928 A * | 9/1999 | Bordignon | B65G 57/18 414/745.9 |
| 6,364,277 B1 * | 4/2002 | Miller | B23Q 3/1546 248/676 |
| 6,634,613 B1 | 10/2003 | Kaper et al. | |
| 6,976,435 B2 | 12/2005 | Lucas et al. | |
| 8,220,769 B2 | 7/2012 | Mainville et al. | |
| 2004/0149610 A1 | 8/2004 | Schutz | |
| 2009/0000526 A1 | 1/2009 | Looker | |
| 2011/0068548 A1 | 3/2011 | Houggard et al. | |
| 2011/0210027 A1 | 9/2011 | Decroix | |
| 2015/0136765 A1 | 5/2015 | Banik | |
| 2015/0290756 A1 | 10/2015 | Blais et al. | |

FOREIGN PATENT DOCUMENTS

| | | |
|---|---|---|
| WO | WO0110747 A1 | 2/2001 |
| WO | WO2011012623 A1 | 2/2011 |

\* cited by examiner

US 9,796,505 B1

BILLET SUPPORT FINGERS FOR PALLETIZATION

BACKGROUND

The present invention relates generally to automated material handling, and more particularly to a method and assembly for automated material handling of heavy objects.

In automated material handling, parts can cause sharp load spikes as the parts are moved, rolled, or dropped into positions along an assembly or manufacturing line. In order to be able to absorb sharp load spikes from parts when the parts are dropped onto pallets, engineers must use pallets that are overly robust, very heavy, and that require a large number of fabrication steps.

SUMMARY

In one aspect, a support assembly includes a pallet table having an upper surface. A plurality of support members are configured to pass through a pallet positioned on the upper surface of the pallet table. Each support member includes a receiving surface that defines a portion of a channel extending across the support members.

In another aspect, a method of supporting a part includes placing a pallet onto a pallet table with a plurality of support members such that the plurality of support members extends through the pallet. The plurality of support members receive the part such that a shock load of the part is absorbed with the of plurality support members.

In yet another aspect, a pallet table includes an upper surface. A plurality of support members are configured to pass through a pallet positioned on the upper surface of the pallet table. Each support member includes a receiving surface. The plurality of support members extend vertically from and orthogonally to the upper surface of the table. A portion of a channel is defined by the receiving surfaces of the plurality of support members. The channel extends across the support members.

The present summary is provided only by way of example, and not limitation. Other aspects of the present disclosure will be appreciated in view of the entirety of the present disclosure, including the entire text, claims and accompanying figures.

Figure 1:
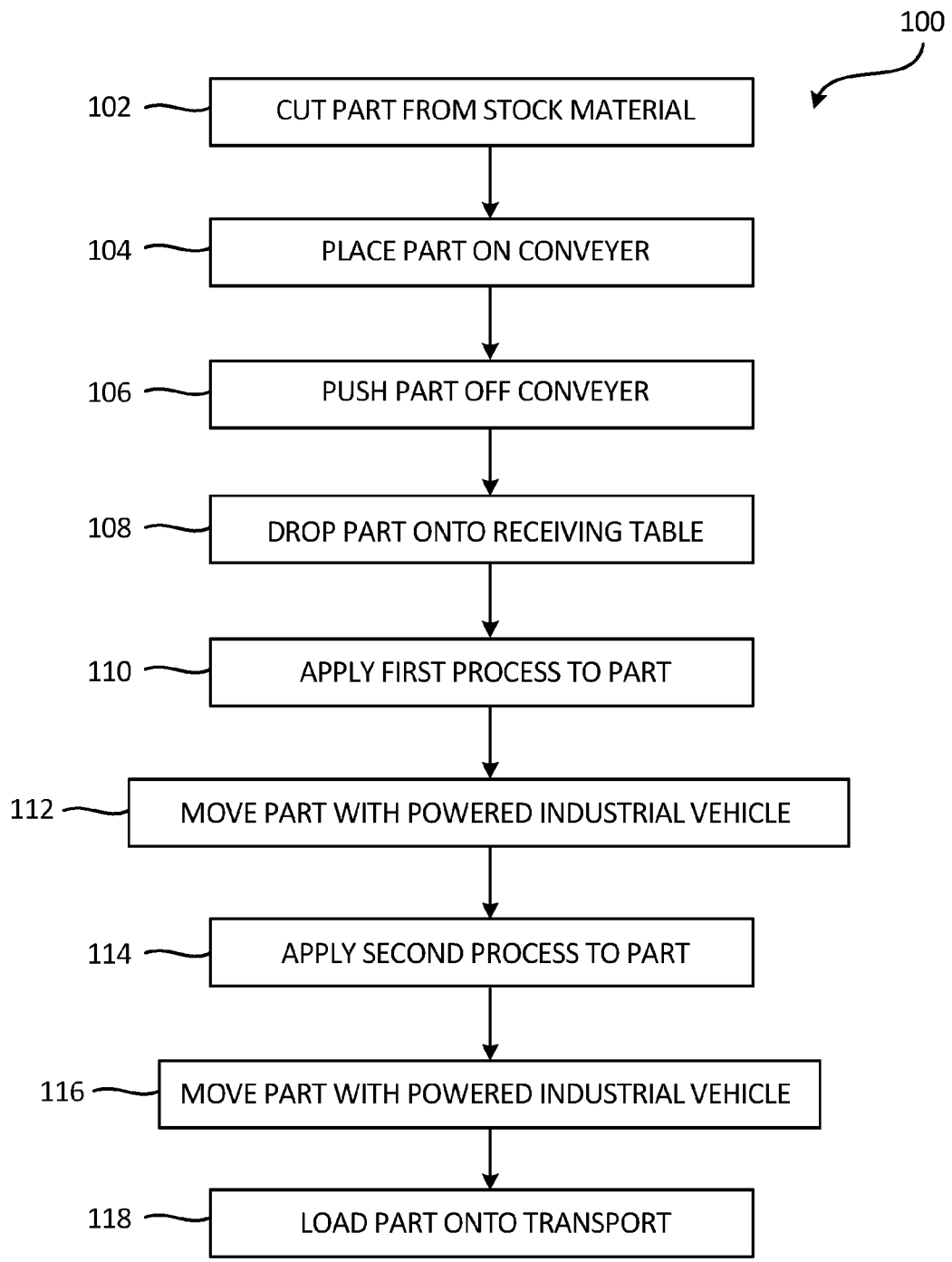
FIG. 1 is a flowchart of a method of moving a part.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

FIG. 1 is a flowchart of method 100 of moving a part. Method 100 includes steps 102-118. Step 102 includes cutting the part from a source of stock material. The part can be cut from extruded metal powder that has been processed into a cylinder, for instance. In one embodiment, the metal powder extrusion can be 8 inches to 11 inches (20.32 centimeters to 27.94 centimeters) in diameter, and can include nickel or other types of metallic material. The part can be cut into a length of 4 to 40 inches (10.16 to 101.6 centimeters).

Step 104 includes placing the part onto a conveyor. The conveyor can include a belt, track, gravity, spiral, vibrating, flexible, pneumatic, lineshaft roller, chain, screw, or another type of conveyor. Step 106 includes pushing the part off of the conveyor. The part can be pushed off of the conveyor with a static guide member or with an actuating member.

Step 108 includes dropping the part onto a receiving table. The part can be dropped from a height of approximately 6 inches (15.24 centimeters) above the receiving table. Step 110 includes applying a first process to the part. The first process can include any number of manufacturing and/or processing steps such as casting, molding, forming, stamping, machining, cutting, separating, joining, heating, hardening, softening, polishing, deburring, cleaning, cataloging, storing, or other types of manufacturing or processing steps. Step 112 includes moving the part with a powered industrial vehicle. Step 114 includes applying a second process to the part. Step 116 includes moving the part with the powered industrial vehicle. Step 118 includes loading the part onto a transport.

Figure 2A:
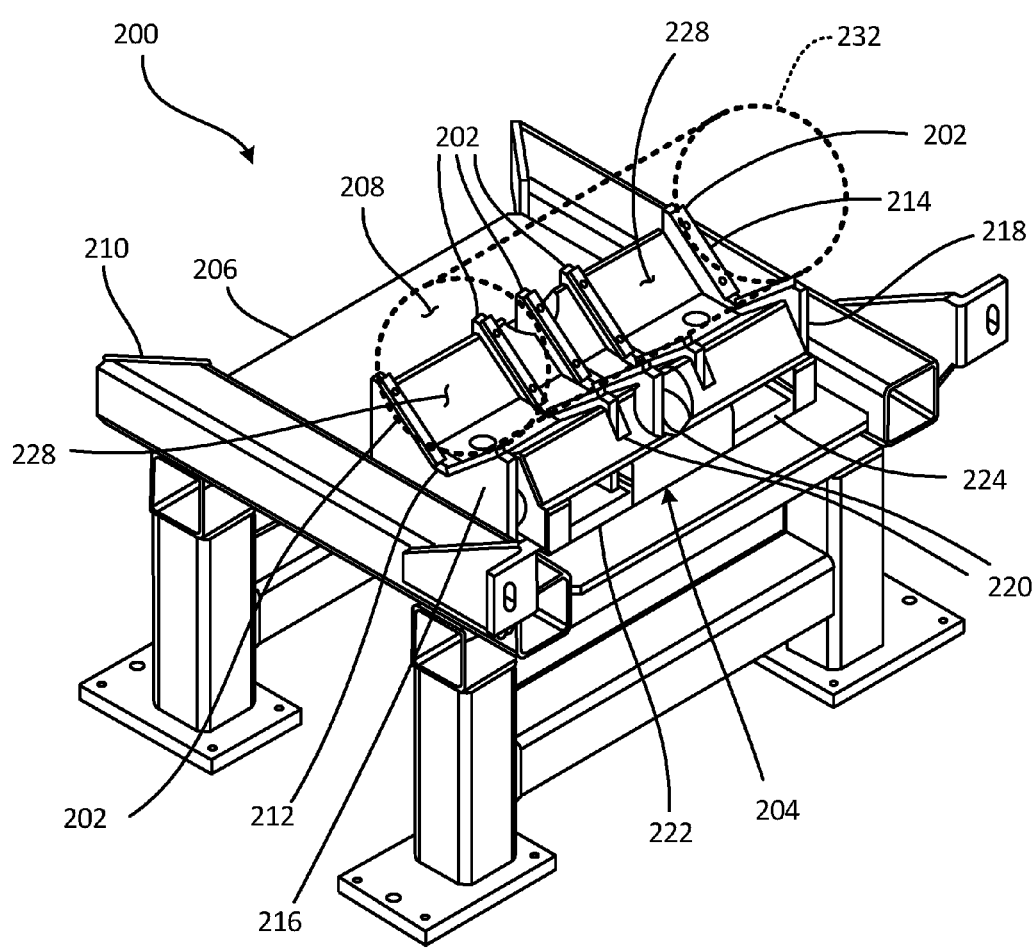
FIG. 2A is a perspective view of an embodiment of a support assembly with support members and a pallet shown in a first position.
Figure 2B:
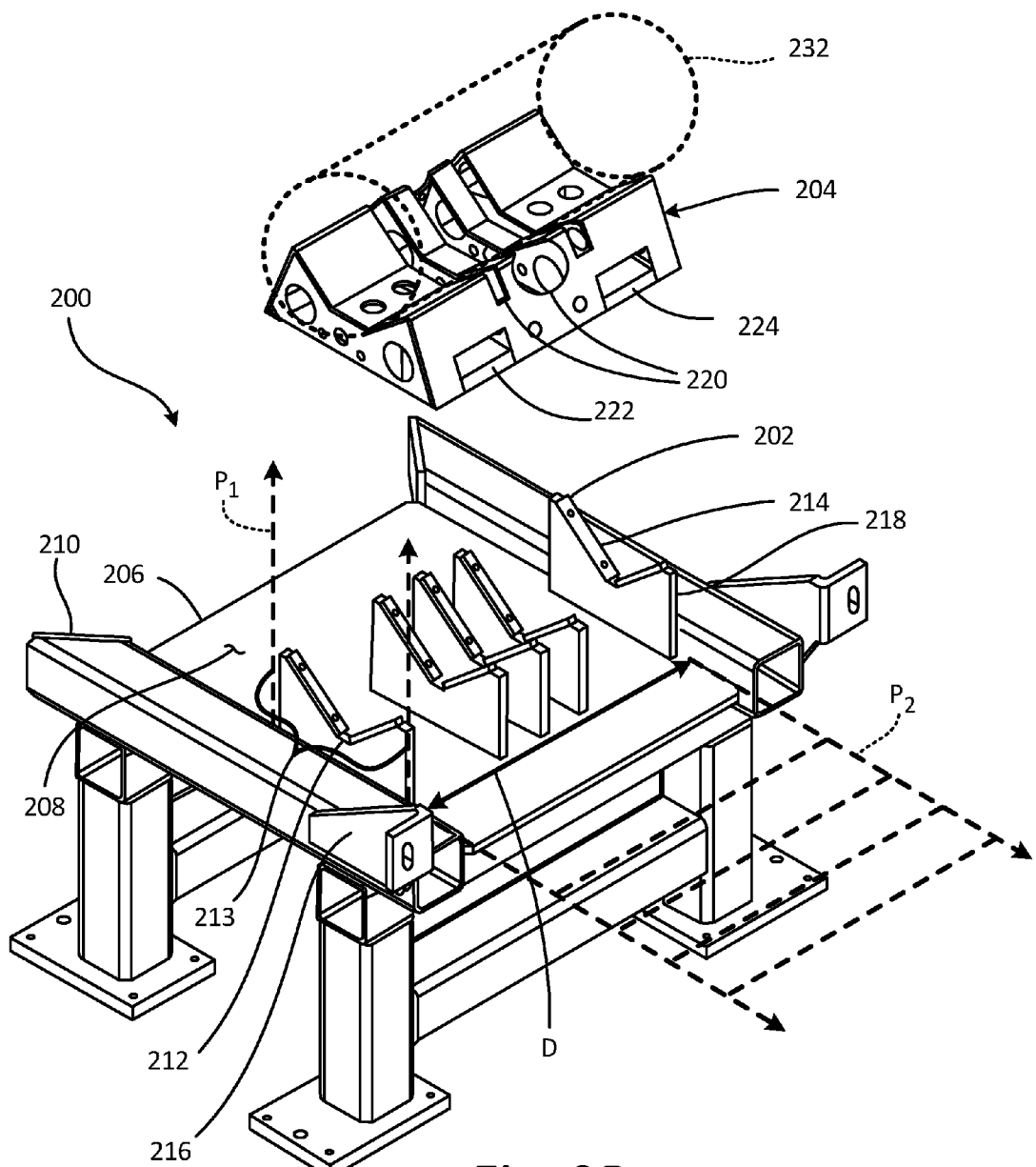
FIG. 2B is a perspective view of the support assembly with support members and the pallet shown in a second position.

FIG. 2A is a perspective view of support assembly 200 with support members 202 and pallet 204 shown in a first position. FIG. 2B is a perspective view of support assembly 200 with support members 202 and pallet 204 shown in a second position. The second position of pallet 204 includes a position that is elevated from pallet table 206 after pallet 204 has been withdrawn from support members 202. In the non-limiting embodiment shown in FIG. 2A, support members 202 can include five individual support members 202. In other non-limiting embodiments, support members 202 can include any number of individual support members 202. The present disclosure is not limited to including the foregoing exemplary types or configurations of support members 202.

Support members 202 are attached to pallet table 206 along upper surface 208 of pallet table 206. Frame 210 holds pallet table 206 in an elevated position and provides stable connection points to the ground or floor for support assembly 200. Pallet table 206 and frame 210 are welded together, but can be also attached through other chemical or mechanical means. Pallet table 206 and frame 210 can be made of a metallic material such as stainless steel or carbon steel.

Pallet table 206 and frame 210 can also include shock absorbing features (not shown in FIG. 2A or 2B) such as solid state, fluid friction, pneumatic, dry friction, hysteresis, internal resistance, inertial resistance, hydro-pneumatic suspension, electrorheological fluid, or magnetic field variation shock absorbers or other types of resilient articles such as springs configured to absorb or damp shock loads experienced by pallet table 206, frame 210, and/or support members 202. The present disclosure is not limited to including the foregoing exemplary types or configurations of pallet table 206 and/or frame 210.

Support members 202 extend vertically from and orthogonal to upper surface 208 of pallet table 206. In some non-limiting embodiments, support members 202 can be formed from the same material as pallet table 206 and can be metallic and can include a material such as stainless steel or carbon steel. Support members 202 can be welded to upper surface 208 of pallet table 206. However, in alternative embodiments, support members 202 can be attached to upper surface 208 through other attachment means, such as mechanical or chemical attachment. Support members 202 can each include receiving surfaces 212 located on a respective top edge of each support member 202. Receiving surfaces 212 can define a portion of channel 213 extending across support members 202. In other words, channel 213 is at least partially defined by receiving surfaces 212 formed on each of the plurality of support members 202. In some non-limiting embodiments, receiving surfaces 212 can define channel 213 such that a shape of channel 213 includes a curved, hexagonal, square, or other geometric shape including at least one local minimum along a surface of the channel such as a V-shape with an angle of approximately 90 degrees as shown in FIGS. 2A and 2B. The present disclosure is not limited to including the foregoing exemplary types or configurations of receiving surfaces 212.

Support members 202 can each also include one or more damping articles 214 at each receiving surface 212 along the top edge of each support member 202. A material used for damping articles 214 can include polyoxymethylene, polyamide, polyethylene, wood, or other materials useful for absorbing an impact. Damping articles 214 cushion part 232 (shown in phantom) dropped onto support members 202. Damping articles 214 can be attached to support members 202 by mechanical, chemical, or adhesive attachment. Examples of attachment for damping articles 214 to support members can include welding, gluing, pressure sensitive adhesive, fasteners, nut and bolt arrangement, and other types of common attachments means. The present disclosure is not limited to including the foregoing exemplary types or configurations of damping articles 214.

In some non-limiting embodiments, support assembly 200 can include one or more individual support members 202, for example, in some non-limiting embodiments, support assembly 200 includes between two and six individual support members. Support members 202 can be positioned on upper surface 208, and as such can be aligned along upper surface 208. Further, in various embodiments, support members 202 can be uniformly or non-uniformly spaced on upper surface 208. For example, first exterior support member 216 can be positioned a distance of 3 to 39 inches (7.62 to 99.06 centimeters) from second exterior support member 218 along upper surface 208, with optional additional support members 202 located between first and second exterior support members 216 and 218.

Pallet 204 is removably placed onto pallet table 206. Pallet 204 includes slots 220, first opening 222, and second opening 224. Slots 220 include a spacing configuration that corresponds to the locations of support members 202. Support members 202 insert through slots 220 and extend through major surface 228 of pallet 204. First opening 222 and second opening 224 are configured to receive lifting arms of a powered industrial vehicle such as fork elements of a forklift. First opening 222 and second opening 224 are aligned with one or more spaces between support members 202. The alignment of first and second openings 222 & 224 with the one or more spaces between support members 202 allows the powered industrial vehicle lifting arms to insert through first and second openings 222 & 224 and into the one or more spaces between support members 202.

During a manufacturing process, support assembly 200 can be used to receive part 232 (shown in phantom). Typically, part 232 is dropped onto pallet 204 with pallet 204 absorbing the shock load of part 232. Because support members 202 extend through pallet 204, when part 232 is dropped onto support assembly 200, the shock load from part 232 being dropped is absorbed by support members 202 and not by pallet 204. The shock load absorbed by support members 202 is attenuated throughout pallet table 206, into frame 210, and into a surface that frame 210 is resting on such as the ground or a floor. Support members 202 absorb and attenuate the shock of sharp load spikes experienced as part 232 is dropped onto support assembly 200 and allow for less material to be used to produce corresponding pallet 204 to transport part 232. Instead of building an overly-resilient pallet that can be very heavy (from 500 to 200 lbs. (226.8 to 90.7 kilograms)) and require a large number of fabrication steps, support members 202 can be made strong enough to absorb the shock load from part 232 while reducing the weight of pallet 204. For example, in some non-limiting embodiments, the weight of pallet 204 may be reduced down to less than 25 lbs. (11.3 kilograms) to provide human handling capability.

As can be seen in FIG. 2B, each of support members 202 extends upwards from upper surface 208 of pallet table 206 in a direction parallel to first plane $P_1$ that is orthogonal to second plane $P_2$ such that upper surface 208 of pallet table 206 upon which support members 202 extend from is parallel to second plane $P_2$. Having support members 202 being orthogonal to upper surface 208 of pallet table 206 helps to prevent support members 202 from buckling or tipping sideways when part 232 comes into contact with support members 202. The orthogonal orientation between support members 202 and upper surface 208 of pallet table 206 also allows for vertical placement and withdrawal of pallet 204 from pallet table 206. In FIGS. 2A & 2B, support members 202 and upper surface 208 are shown as having a planar shape, however in other embodiments support members 202 and upper surface 208 can include non-planar shapes and configurations.

Once pallet 204 has been withdrawn from support members 202, pallet 204 with or without part 232 positioned on pallet 204 can be moved onto the next step in a manufacturing process.

Distance D defines a distance between first exterior support member 216 and second exterior support member 218. In some non-limiting embodiments, distance D is a distance of 3 to 39 inches (7.62 to 99.06 centimeters). In a non-limiting embodiment, with distance D including a distance 39 inches (99.06 centimeters), support members 202 can support part 232 with a length of up to approximately 40 inches (101.6 centimeters) or greater. In another non-limiting embodiment, a distance between any one of support members 202 to any other one of support members 202 can include a minimum distance of 3 inches (7.62 centimeters), such that support members 202 could support part 232 with a length of approximately 4 inches (10.16 centimeters). Distance D can be set to a distance that will allow all or some of support members 202 to catch part 232 as part 232 is dropped onto support assembly 200. In one non-limiting embodiment, support members 202 can be positioned such that at least two support members 202 will support part 232. Spacing between consecutive support members 202 can include distances suitable for equal displacement of the shock load from part 232 based upon a mass, width, circumference, size, and/or length of part 232. The present disclosure is not limited to including the foregoing exemplary types or configurations of distance D or any distance between any of support members 202.

Figure 3:
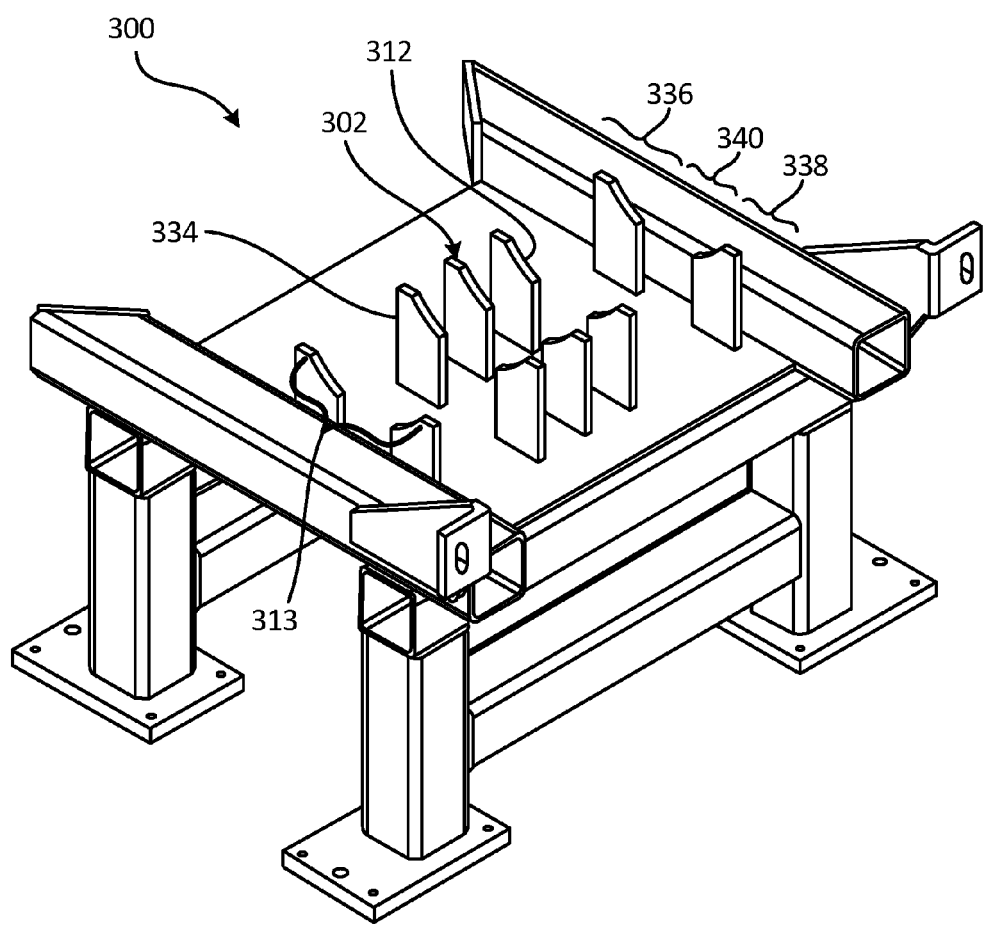
FIG. 3 is a perspective view of another embodiment of a support assembly with support members shown as panels.

FIG. 3 is a perspective view of support assembly 300 with support members 302 in accordance with another embodiment of the present disclosure. In one non-limiting embodiment, support members 302 can be positioned such that support members 302 include panels 334 which are split into first row 336 and second row 338. First row 336 and second row 338 of panels 334 can be separated by gap 340. Gap 340 can be set to a distance that will allow all or some of support members 302 to catch a part as the part is dropped onto support assembly 300. In one non-limiting embodiment, support members 302 can be positioned such that at least two support members 302 will support a part. The distance of gap 340 can include distances suitable for equal displacement of the shock load from the part based upon a mass, width, circumference, size, and/or length of the part. Additionally, the shapes, sizes, and quantity of panels 334 can be selected to account for parts with varying shapes such as those including swept surfaces, curves, castings, etc. The present disclosure is not limited to including the foregoing exemplary types or configurations of support members 302, panels 334, or gap 340.

Support members 302 can each include receiving surfaces 312 located on a respective top edge of each support member 302. Receiving surfaces 312 can define a portion of channel 313 extending across support members 302. In other words, channel 313 is at least partially defined by receiving surfaces 312 formed on each of the plurality of support members 302. In some non-limiting embodiments, receiving surfaces 312 can define channel 313 such that a shape of channel 313 includes a curved, hexagonal, square, or other geometric shape such as a curved shaped as shown in FIG. 3. The present disclosure is not limited to including the foregoing exemplary types or configurations of receiving surfaces 312.

Figure 4:
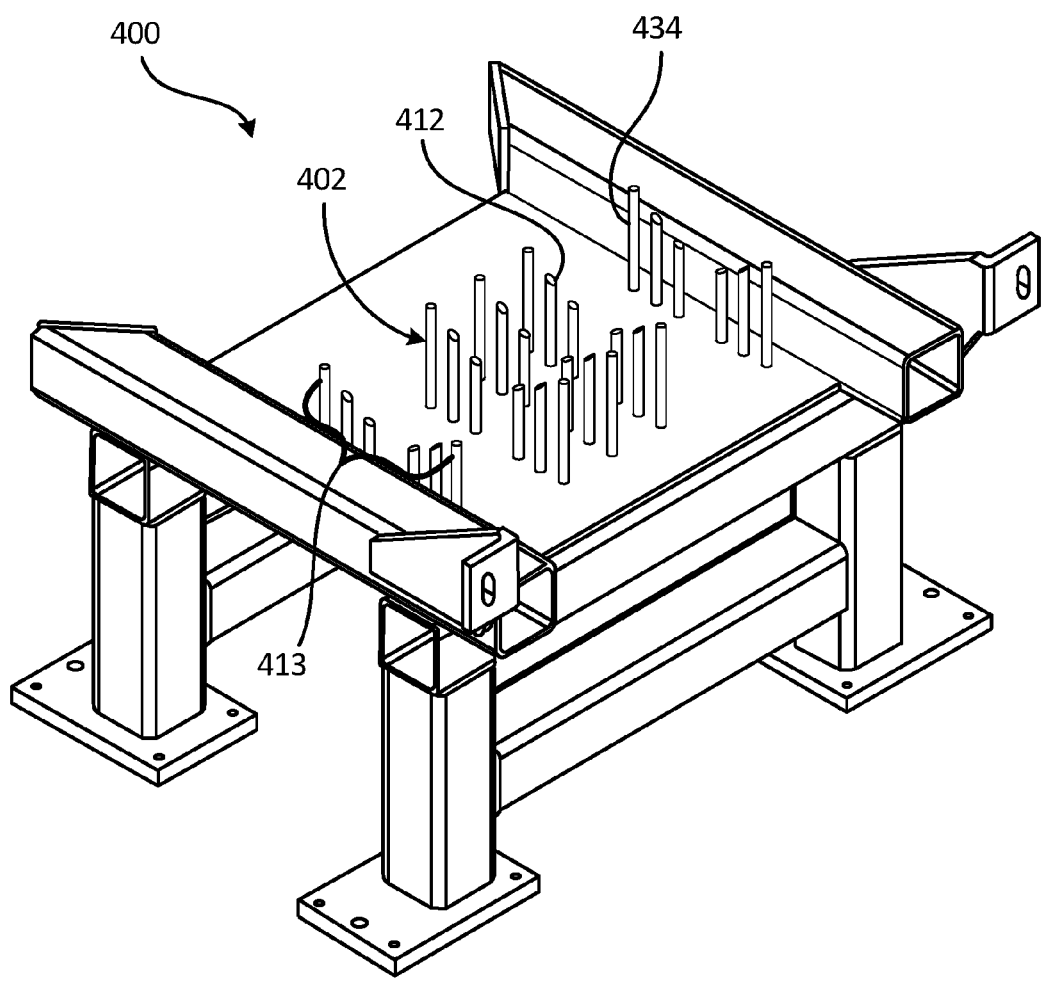
FIG. 4 is a perspective view of yet another embodiment of a support assembly with support members shown as rods.

FIG. 4 is a perspective view of support assembly 400 with support members 402 in accordance with another embodiment of the present disclosure. In one non-limiting embodiment, support members 402 can be positioned such that support members 402 include rods 434. A configuration of rods 434 can be set to allow all or some of rods 434 to catch a part as the part is dropped onto support assembly 400. In one non-limiting embodiment, rods 434 can be positioned such that at least four rods 434 will support a part. The configuration of rods 434 can include configurations suitable for equal displacement of the shock load from the part based upon a mass, width, circumference, size, and/or length of the part. Additionally, the shapes, sizes, and quantity of rods 434 can be selected to account for parts with varying shapes such as those including swept surfaces, curves, castings, etc. The present disclosure is not limited to including the foregoing exemplary types or configurations of support members 402 or rods 434.

Support members 402 can each include receiving surfaces 412 located on a respective top edge of each support member 402. Receiving surfaces 412 can define a portion of channel 413 extending across support members 402. In other words, channel 413 is at least partially defined by receiving surfaces 412 formed on each of the plurality of support members 402. In some non-limiting embodiments, receiving surfaces 412 can define channel 413 such that a shape of channel 413 includes a curved, hexagonal, square, or other geometric shape such as a v-shape as shown in FIG. 4. The present disclosure is not limited to including the foregoing exemplary types or configurations of receiving surfaces 412.

Figure 5A:
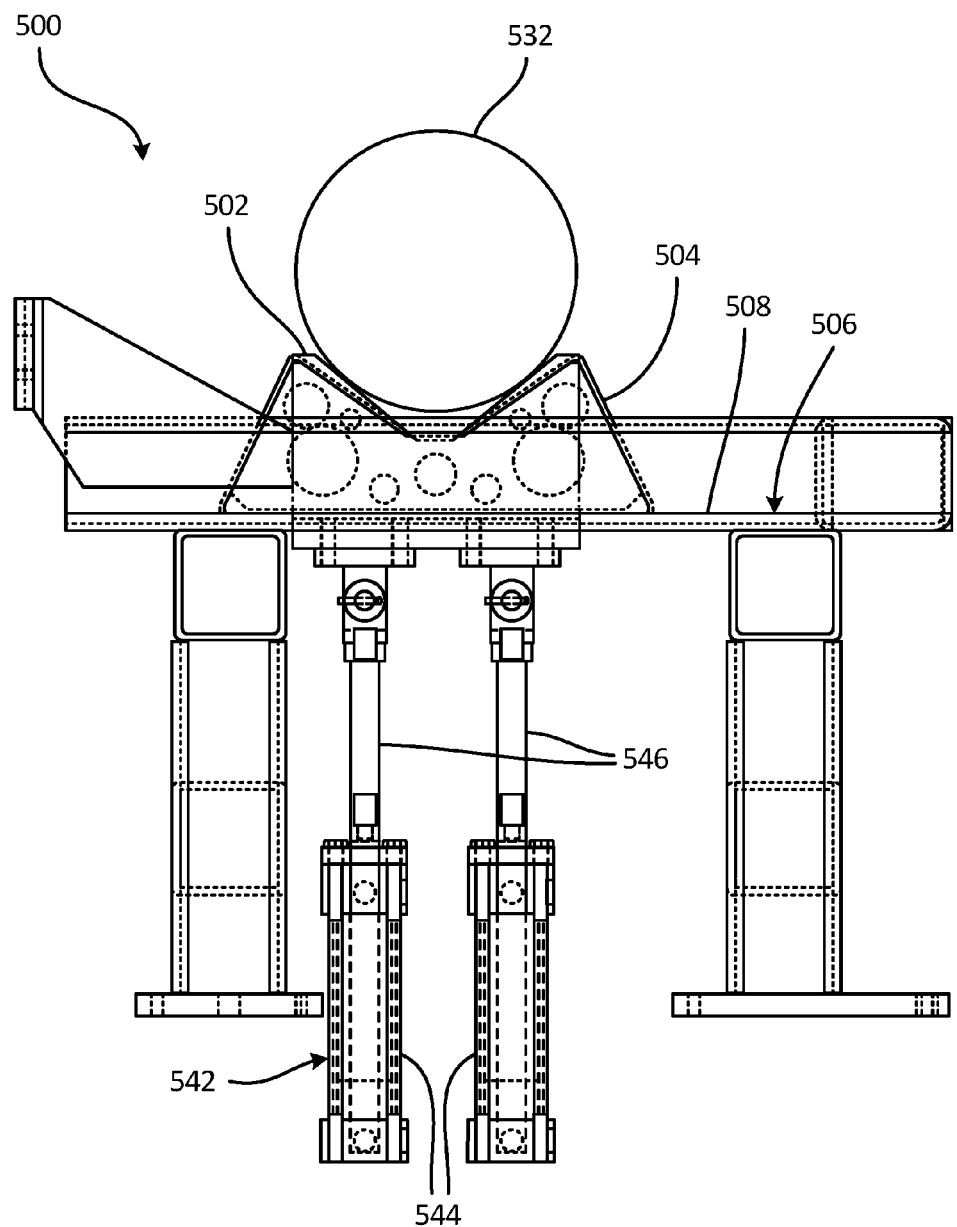
FIG. 5A is a side view of another embodiment of a support assembly with support members shown in a first position.
Figure 5B:
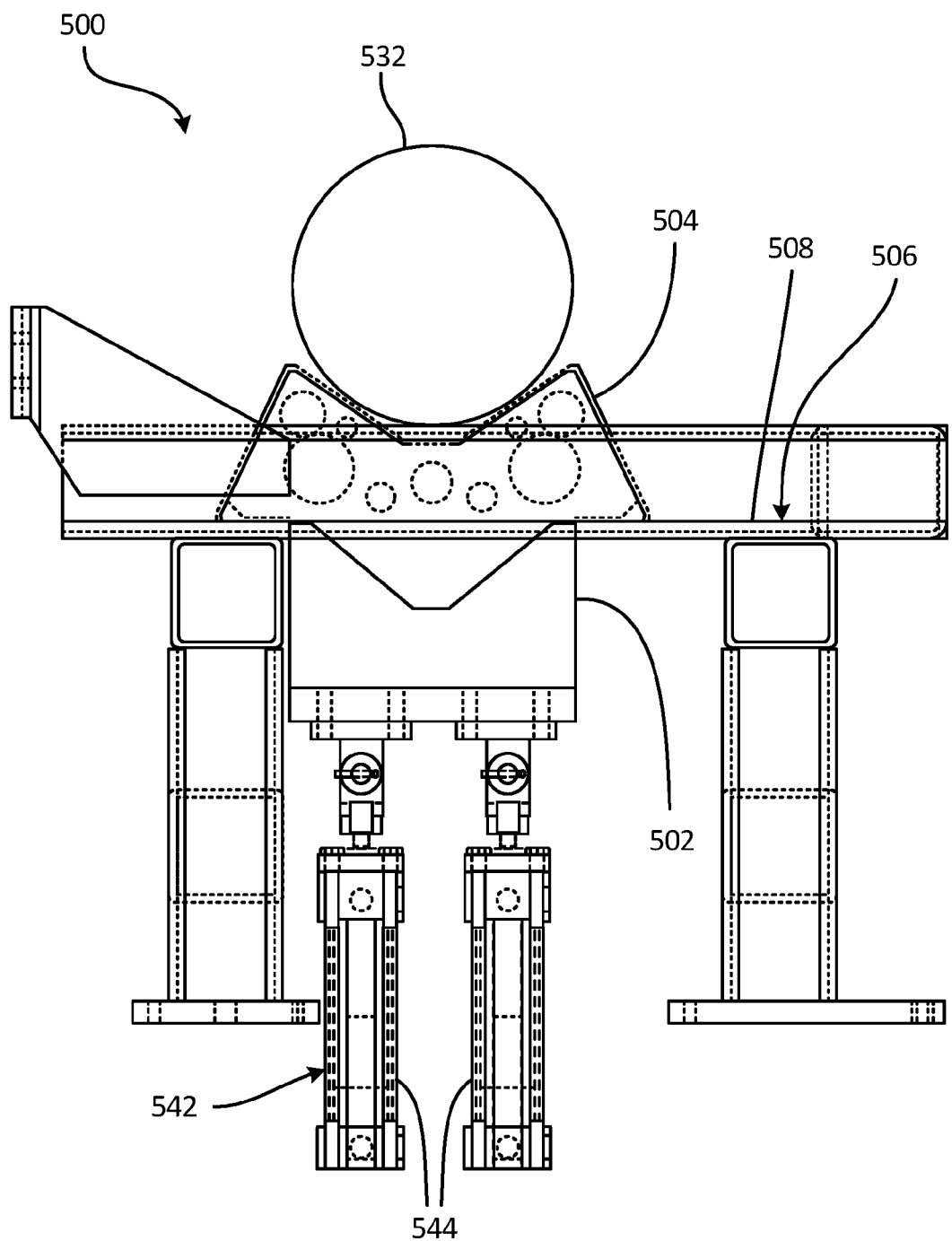
FIG. 5B is a side view of the support assembly with support members shown in a second position.

FIGS. 5A-5B show side views of an alternative configuration in accordance with an embodiment of the present disclosure. FIG. 5A is a side view of support assembly 500 with support members 502 shown in a first position. FIG. 5B is a side view of support assembly 500 with support members 502 shown in a second position. Support members 502 are attached to support element 542. In some non-limiting embodiments, support element 542 can include actuators 544 which are configured to raise and lower support members 502 relative to pallet table 506. Actuators 544 can include actuating arms 546 which can be directly connected or attached to support members 502 by mechanical or other means. In some non-limiting embodiments, actuators 544 can specifically include linear actuators (as shown in FIG. 5A) but can also include other any other general type of actuator such as pneumatic, electrical, hydraulic, or mechanical actuator which produce any linear, rotary, or oscillatory motions. The present disclosure is not limited to including the foregoing exemplary types or configurations of actuators 544.

During a manufacturing process, support assembly 500 can be used to receive part 532 with support members 502 in the first position (as shown in FIG. 5A). When part 532 is dropped onto support assembly 500, the shock load from part 532 being dropped is absorbed by support members 502 and not by pallet 504. Support members 502 absorb and attenuate the shock of sharp load spikes experienced as part 532 is dropped onto support assembly 500. The shock load absorbed by support members 502 is attenuated throughout support element 542 and into a surface that support element 542 is connected to such as the ground or a floor. In some non-limiting embodiments, support element 542 can also include shock absorbing features such as solid state, fluid friction, pneumatic, dry friction, hysteresis, internal resistance, inertial resistance, hydro-pneumatic suspension, electrorheological fluid, or magnetic field variation shock absorbers or other types of resilient articles such as springs configured to absorb or damp shock loads experienced by support members 502. As such, support element 542 can be a representation of any of these shock absorbers or types of resilient articles. The present disclosure is not limited to including the foregoing exemplary types or configurations of support element 542.

For example, as shown in FIG. 5A, support members 502 can occupy a first position with actuating arms 546 extended from actuators 544. In the first position, support members 502 extend through pallet table 506 and through pallet 504 such that support members 502 extend above pallet 504. As part 532 is dropped onto support assembly 500, part 532 comes into contact with and settles onto support members 502 that are extended through pallet table 506 and through pallet 504.

As can be seen in FIG. 5B, support members 502 can be lowered into a second position with actuating arms 546 retracted into actuators 544. The second position of support members 502 includes drawing support members 502 out of and from pallet 504 causing part 532 to be lowered onto pallet 504. In some non-limiting embodiments, moving support members 502 to the second position includes drawing support members 502 to a position below upper surface 508 of pallet table 506 and may eliminate a need to remove pallet 504 from pallet table 506 with a powered industrial vehicle. For example, such configuration can allow the use of support assembly 500 in combination with a continuous conveyor configuration. That is, in some non-limiting embodiments, upper surface 508 may be part of a conveyor or other moveable surface that can transfer or move pallet 504 supporting part 532.

Figure 6:
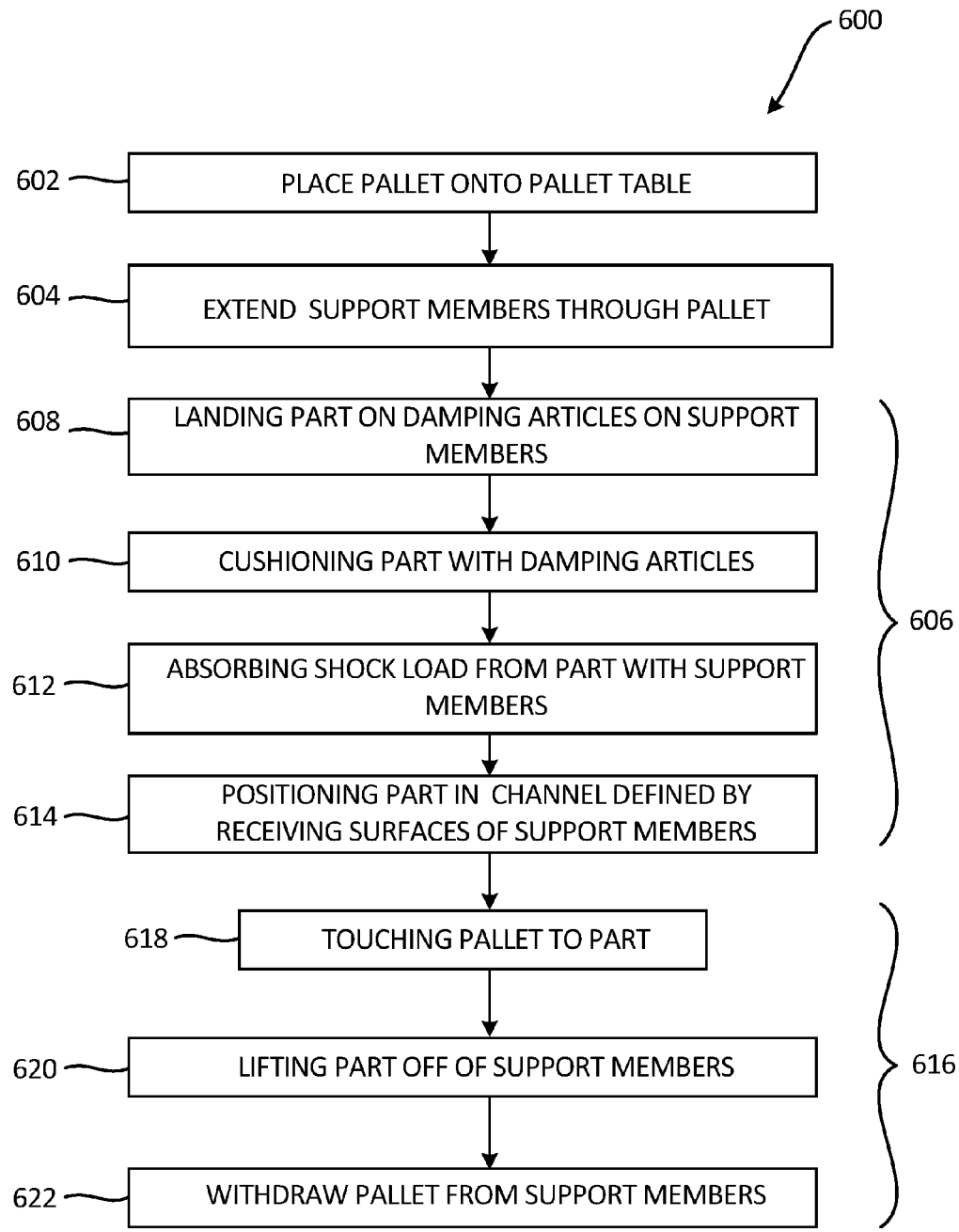
FIG. 6 is a flowchart of a method of using a pallet table with support members.

FIG. 6 is a flowchart of method 600 for using a support assembly with support members. Step 602 includes placing a pallet onto a pallet table. Step 604 includes extending the support members through the pallet.

Receiving the part with the support members (collectively, step 606) includes steps 608-614. Step 608 includes landing a part on optional damping articles positioned on the support members. Landing the part on the damping articles includes dropping the part onto the support members and contacting the support members with the part. Step 610 includes cushioning the dropped part with the damping articles. Step 612 includes absorbing a shock load with the support members from the part being dropped onto the support members. The damping articles can also absorb part of the shock load. The shock load absorbed by the support members can also be transferred to a pallet table and a frame of the support assembly. Step 614 includes positioning a portion of the part in a channel at least partially defined by receiving surfaces formed on each of the plurality of support members. The part is then rested on the support members.

Raising the pallet (collectively, step 616) includes steps 618-622. A lifting mechanism, such as fork elements of a powered industrial vehicle, is then engaged with the pallet through openings in the pallet. The lifting mechanism can be inserted in between support members. Step 618 includes touching the pallet to the part. Step 620 includes lifting the part off of the plurality of support members with the pallet. Step 622 includes withdrawing the pallet from the support members.

Figure 7:
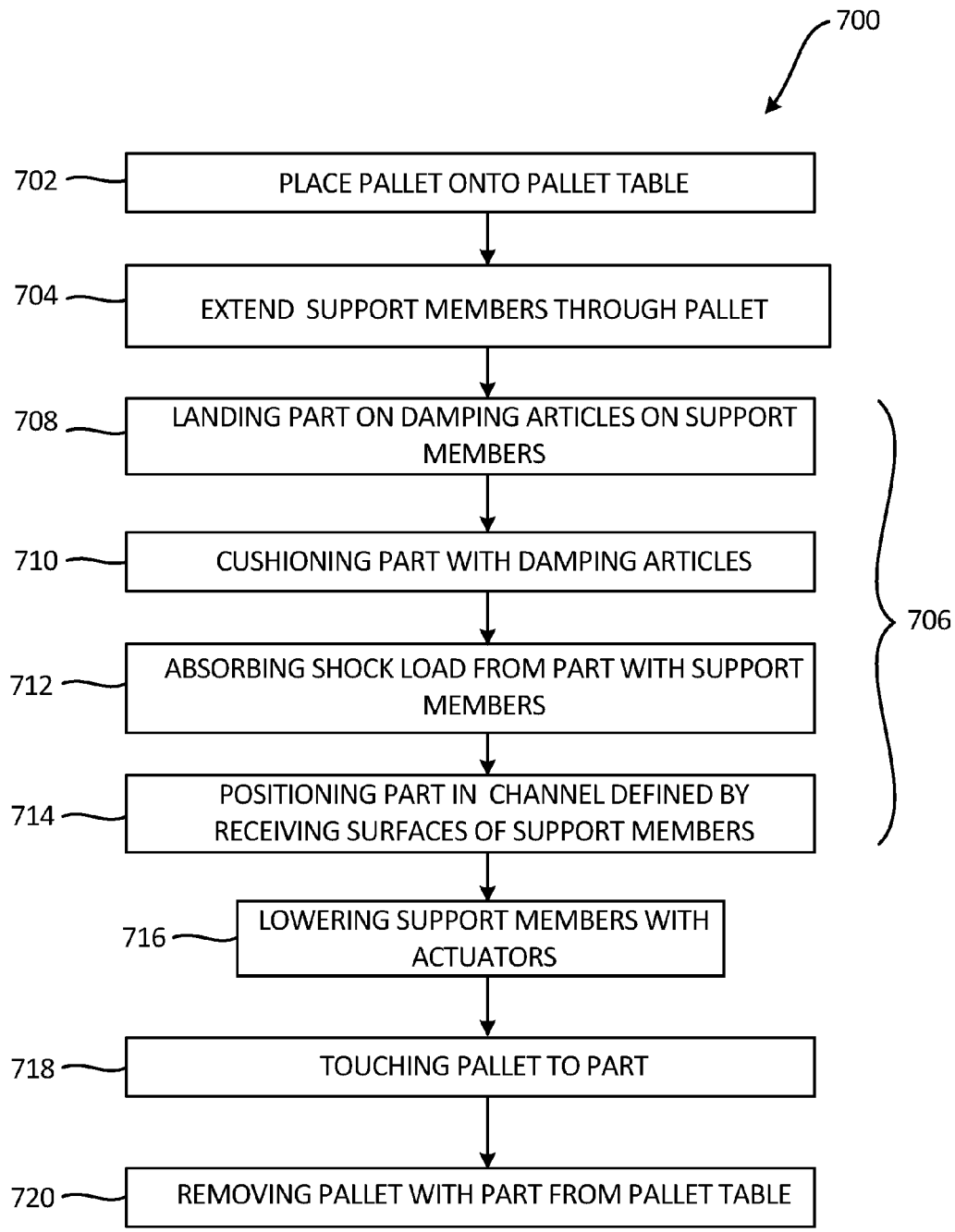
FIG. 7 is a flowchart of another embodiment of a method of using a pallet table with support members.

FIG. 7 is a flowchart of method 700 for using a support assembly with support members in accordance with another embodiment of the present disclosure. Step 702 includes placing a pallet onto a pallet table. Step 704 includes extending the support members through the pallet.

Receiving the part with the support members (collectively, step 706) includes steps 708-714. Step 708 includes landing a part on damping articles positioned on the support members. Landing the part on the damping articles includes dropping the part onto the support members and contacting the support members with the part. Step 710 includes cushioning the dropped part with the damping articles. Step 712 includes absorbing a shock load from the part being dropped onto the support members with the support members. The damping articles can also absorb part of the shock load. The shock load absorbed by the support members can also be transferred to a support element configured to raise and lower the support members relative to the pallet table. Step 714 includes positioning a portion of the part in a channel at least partially defined by receiving surfaces formed on each of the plurality of support members. The part is then rested on the support members.

Step 716 includes lowering the support members relative to pallet table with actuators connected to support members such that the support members are withdrawn from the pallet. Step 718 includes touching the part to the pallet. Step 720 includes removing the pallet with the part from the pallet table.

DISCUSSION OF POSSIBLE EMBODIMENTS

The following are non-exclusive descriptions of possible embodiments of the present invention.

A support assembly can include a pallet table having an upper surface. A plurality of support members can be configured to pass through a pallet positioned on the upper surface of the pallet table. Each support member can include a receiving surface that defines a portion of a channel extending across the support members.

The support assembly of the preceding paragraph can optionally include, additionally and/or alternatively, any one or more of the following features, configurations and/or additional components:

a further embodiment of the foregoing support assembly, wherein each of the plurality of support members can extend upwards from the upper surface of the table in a direction parallel to a first plane that can be orthogonal to a second plane, wherein the upper surface of the table upon which the support members extend from can be parallel to the second plane;

a further embodiment of any of the foregoing support assemblies, wherein the plurality of support members can consist of 2 to 6 support members;

a further embodiment of any of the foregoing support assemblies, wherein the support assembly can further comprise a plurality of slots in the pallet, the plurality of slots can have a spacing configuration that corresponds to locations of the support members;

a further embodiment of any of the foregoing support assemblies, wherein the pallet can further include a first opening and a second opening in the pallet which can be shaped to receive fork elements of a powered industrial vehicle, wherein the first opening and the second opening can be aligned with one or more spaces between the support members;

a further embodiment of any of the foregoing support assemblies, wherein each of the plurality of support members can further comprise a damping article along a top edge of each of the plurality of support members;

a further embodiment of any of the foregoing support assemblies, wherein the channel can include a shape selected from the group consisting of v-shaped, curved, hexagonal, and/or square;

a further embodiment of any of the foregoing support assemblies, wherein the support members can be attached to a support element that can be configured to raise and lower the support members relative to the pallet table; and/or a further embodiment of any of the foregoing support assemblies, wherein the support element can include an actuator selected from the group consisting of pneumatic, electrical, hydraulic, and/or mechanical.

A method of supporting a part can include placing a pallet onto a pallet table with a plurality of support members such that the plurality of support members can extend through the pallet. The part with the plurality of support members can be received such that a shock load of the part can be absorbed with the of plurality support members.

The method of the preceding paragraph can optionally include, additionally and/or alternatively, any one or more of the following features, configurations and/or additional components:

a further embodiment of the foregoing method, wherein the method can further comprise landing the part on damping articles that can be positioned on the plurality of support members, cushioning the dropped part with the damping articles, and/or positioning a portion of the part in a channel that can at least be partially defined by receiving surfaces formed on each of the plurality of support members;

a further embodiment of any of the foregoing methods, wherein the method can further comprise raising the pallet, touching the pallet to the part, lifting the part off of the plurality of support members with the pallet; and withdrawing the pallet from the plurality of support members; and/or a further embodiment of any of the foregoing methods, wherein the method can further comprise, lowering the support members relative to pallet table with actuators connected to support members such that the support members can be withdrawn from the pallet, touching the part to the pallet, and removing the pallet with the part from the pallet table.

A pallet table can include an upper surface. A plurality of support members can be configured to pass through a pallet positioned on the upper surface of the pallet table. Each support member can include a receiving surface. The plurality of support members can extend vertically from and orthogonally to the upper surface of the table. A portion of a channel can be defined by the receiving surfaces of the plurality of support members. The channel can extend across the support members.

The pallet table of the preceding paragraph can optionally include, additionally and/or alternatively, any one or more of the following features, configurations and/or additional components:

a further embodiment of the foregoing pallet table, wherein the pallet can further comprise a plurality of slots in the pallet, the plurality of slots can have a spacing configuration that can correspond to locations of the support members, and a first opening and a second opening in the pallet which can be shaped to receive fork elements of a powered industrial vehicle, wherein the first opening and the second opening can be aligned with a space between the support members;

a further embodiment of any of the foregoing pallet tables, wherein the pallet table can further comprise a first exterior support member and a second exterior support member that can be positioned a distance of 3 to 39 inches (7.62 to 99.06 centimeters) from the first exterior support member;

a further embodiment of any of the foregoing pallet tables, wherein the support members can be attached to a support element configured to raise and lower the support members relative to the pallet table;

a further embodiment of any of the foregoing pallet tables, wherein the support element can further comprise an actuator selected from the group consisting of pneumatic, electrical, hydraulic, and/or mechanical;

a further embodiment of any of the foregoing pallet tables, wherein the channel can include a shape selected from the group consisting of v-shaped, curved, hexagonal, and/or square; and/or a further embodiment of any of the foregoing pallet tables, wherein the support element can include an actuator configured to produce a motion of the support members, wherein the motion can be selected from the group consisting of linear, rotary, and oscillatory.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, torsional, tensile, compressive, or vibrational operational conditions, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

The invention claimed is:

1. A support assembly comprising:
    a pallet;
    a pallet table having an upper surface; and
    a plurality of support members connected to and extending upwards from the upper surface of the pallet table, wherein the plurality of support members are configured to pass through the pallet when the pallet is positioned on the upper surface of the pallet table such that the plurality of support members extend above the pallet, wherein the plurality of support members are attached to a support element configured to raise and lower the support members relative to the pallet table, wherein the support element includes an actuator selected from the group consisting of a pneumatic actuator, an electrical actuator, a hydraulic actuator, and a mechanical actuator, wherein each support member includes a receiving surface that defines a portion of a channel extending across the support members, wherein the plurality of support members are configured to absorb and attenuate a shock of a sharp load spike of a part being dropped onto the plurality of support members, and wherein the plurality of support members are positioned to receive the part above the pallet such that the part does not come into contact with the pallet.

2. The support assembly of claim 1, wherein each of the plurality of support members extends upwards from the upper surface of the table in a direction parallel to a first plane that is orthogonal to a second plane, wherein the upper surface of the table upon which the support members extend from is parallel to the second plane.

3. The support assembly of claim 1, wherein the plurality of support members consists of 2 to 6 support members.

4. The support assembly of claim 1, further comprising:
    a plurality of slots in the pallet, the plurality of slots with a spacing configuration that corresponds to locations of the support members.

5. The support assembly of claim 1, wherein the pallet further comprises:
a first opening and a second opening in the pallet which are shaped to receive fork elements of a powered industrial vehicle, wherein the first opening and the second opening are aligned with at least one space between the support members.

6. The support assembly of claim 1, wherein each of the plurality of support members comprises:
a damping article along a top edge of each of the plurality of support members.

7. The support assembly of claim 1, wherein the channel includes a shape selected from the group consisting of v-shaped, curved, hexagonal, and square.

8. The support assembly of claim 1, wherein the support element comprises a solid state, fluid friction, pneumatic, dry friction, hysteresis, internal resistance, inertial resistance, hydro-pneumatic suspension, electrorheological fluid, or magnetic field variation shock absorber.

9. A method of supporting a part, the method comprising:
placing a pallet onto an upper surface of a pallet table with a plurality of support members, wherein the plurality of support members is connected to and extends upwards from the upper surface of the pallet table, wherein the plurality of support members are configured to pass through the pallet such that the plurality of support members extend above the pallet, wherein the plurality of support members are attached to a support element configured to raise and lower the support members relative to the pallet table, wherein the support element includes an actuator selected from the group consisting of a pneumatic actuator, an electrical actuator, a hydraulic actuator, and a mechanical actuator, wherein each support member includes a receiving surface that defines a portion of a channel extending across the support members, wherein the plurality of support members are configured to absorb and attenuate a shock of a sharp load spike of a part being dropped onto the plurality of support members, and wherein the plurality of support members are positioned to receive the part above the pallet such that the part does not come into contact with the pallet;
dropping the part onto the support elements; and
receiving the part with the plurality of support members such that a shock load of the part is absorbed with the of plurality support members and such that the part does not come into contact with the pallet.

10. The method of claim 9, further comprising:
landing the part on damping articles positioned on the plurality of support members;
cushioning the dropped part with the damping articles;
attenuating the shock load of the part throughout the pallet table and into a frame supporting the pallet table, and
positioning a portion of the part in a channel at least partially defined by receiving surfaces formed on each of the plurality of support members.

11. The method of claim 9, further comprising:
raising the pallet;
touching the pallet to the part;
lifting the part off of the plurality of support members with the pallet; and
withdrawing the pallet from the plurality of support members.

12. The method of claim 9, further comprising:
lowering the support members relative to pallet table with actuators connected to the support members such that the support members are withdrawn from the pallet;
touching the part to the pallet; and
removing the pallet with the part from the pallet table.

13. A pallet table for receiving a pallet, the pallet table comprising:
an upper surface;
a plurality of support members connected to and extending upwards from the upper surface of the pallet table, wherein the plurality of support members are configured to pass through the pallet positioned on the upper surface of the pallet table such that the plurality of support elements extend above the pallet, wherein each support member includes a receiving surface, wherein the plurality of support members are configured to absorb and attenuate a shock of a sharp load spike of a part being dropped onto the plurality of support members, and wherein the plurality of support members are positioned to receive the part above the pallet such that the part does not come into contact with the pallet;
a first exterior support member;
a second exterior support member positioned a distance of 3 to 39 inches (7.62 to 99.06 centimeters) from the first exterior support member; and
a portion of a channel defined by the receiving surfaces of the plurality of support members, wherein the channel extends across the support members.

14. The pallet table of claim 13, the pallet further comprising:
a plurality of slots in the pallet, the plurality of slots with a spacing configuration that corresponds to locations of the support members; and
a first opening and a second opening in the pallet which are shaped to receive fork elements of a powered industrial vehicle, wherein the first opening and the second opening are aligned with a space between the support members.

15. The pallet table of claim 13, wherein the support members are attached to a support element configured to raise and lower the support members relative to the pallet table.

16. The pallet table of claim 15, wherein the support element includes an actuator selected from the group consisting of a pneumatic actuator, an electrical actuator, a hydraulic actuator, and a mechanical actuator.

17. The pallet table of claim 15, wherein the support element includes an actuator configured to produce a motion of the support members, wherein the motion is selected from the group consisting of linear, rotary, and oscillatory.

18. The pallet table of claim 15, wherein the support element comprises a solid state, fluid friction, pneumatic, dry friction, hysteresis, internal resistance, inertial resistance, hydro-pneumatic suspension, electrorheological fluid, or magnetic field variation shock absorber.

19. The pallet table of claim 13, wherein the channel includes a shape selected from the group consisting of v-shaped, curved, hexagonal, and square.

* * * * *